UNITED STATES PATENT OFFICE.

LEONARD ROBERTS COATES, OF BALTIMORE, MARYLAND.

PROCESS OF MAKING SOIL ANTITOXIN.

947,797.

Specification of Letters Patent. Patented Feb. 1, 1910.

No Drawing. Application filed April 26, 1909. Serial No. 492,289.

*To all whom it may concern:*

Be it known that I, LEONARD ROBERTS COATES, of the city of Baltimore and State of Maryland, have invented an Improved Method of Producing Antitoxins and Applying the Same to Soils, of which the following is a specification.

By investigation I have discovered that in many cases, want of fertility in soils, is due not so much to paucity therein of micro-organisms adapted to abstract nitrogen from the air and fix the same in plants, or of those micro-organisms which as stated in my application Serial No. 492,287 filed on the 26th day of April, 1909, render available for plant food, the insoluble salts of phosphorus, potash and lime, but from toxins consisting wholly or in part of emanations from, or the excrement voided by the said micro-organisms, or given off by the plants either independently of, or in connection with such micro-organisms.

In my researches, I have discovered that the toxins above referred to, are rendered harmless by certain bacteria of putrefaction; but as there are found in decomposing animal matter various species of micro-organisms too numerous to mention, it is impossible for me at this time, to specify the particular class or classes of micro-organisms which serve as anti-toxins when applied to the soil.

In support of the above statement with respect to the difficulty in classifying the various micro-organisms found in decomposing animal matter, I refer to Section IV Part II of Sternberg's *Text-Book of Bacteriology*, New York, 1901.

Notwithstanding the complex changes taking place in animal matter during the process of putrefaction, I have demonstrated that in all cases and under all conditions, there are present in the said matter, the particular class or classes of micro-organisms which effect the result before stated, and when the same are provided with a proper food and incorporated with the soil, they will render harmless the toxins produced as aforesaid, and I therefore prefer to base my invention on the use of the material carrying the micro-organisms, rather than to identify the organisms by name or classification.

In carrying out my invention I prepare a sterilized culture-mixture such as bouillon containing sugar and phosphate of potash, which will sustain the life of bacteria, and impregnate or inoculate the same by immersing therein or adding thereto, decomposing animal matter, thus obtaining a pure culture of such bacteria as are found in the same, inclusive of those in the particular class which effect the result sought to be attained. I then prepare a food for bacteria composed of ground raw bone or some other suitable substance, and sterilize the same by heat or any analogous process, and then moisten the food with the pure culture described.

The material obtained by the method above set forth, consists of a pure culture of the micro-organisms found in putrefying animal matter together with a sterilized food for the same, and when the material is applied to the soil, the micro-organisms thereby introduced, having a food adapted to sustain their life and actively, increase and multiply; and certain of them in accordance with their peculiar functions discovered by me as above stated, render harmless the toxic emanations produced as aforesaid. The said material may be used after the manner of a fertilizer, in its concentrated form or it may be increased in bulk by addition thereto of sterilized phosphate rock or some inert sterile filler, to any reasonable extent.

According to my researches, the micro-organisms contained in decomposing animal matter are not antagonistic to, or destructive of the benign bacteria which in some manner promote plant life; and it is believed that should the soil embrace only the plant-food-producing micro-organisms described, and those herein mentioned as anti-toxins together with a proper food for the same, would preserve its fertility for an indefinite period.

I claim as my invention,—

The method of producing an anti-toxin material adapted to counteract in soils, the destructive result of the presence therein of the excreta of plant-food-producing micro-organisms, or the toxic emanations of plants, which consists in sterilizing a feed for bacteria; then sterilizing a culture-mixture adapted to sustain the life of bacteria; then inoculating the said sterilized culture-mixture with the micro-organisms which produce putrefaction in organic substances, and then moistening the sterilized food with the pure culture produced as described, substantially as specified.

LEONARD ROBERTS COATES.

Witnesses:
WM. T. HOWARD,
HUGH L. BOND, 3rd.